Oct. 5, 1965 R. C. BENTON 3,210,550
PHOTOSENSITIVE TABLE POSITIONING CONTROL
Filed Aug. 13, 1962 3 Sheets-Sheet 1

INVENTOR.
Robert C. Benton
BY
ATTORNEY

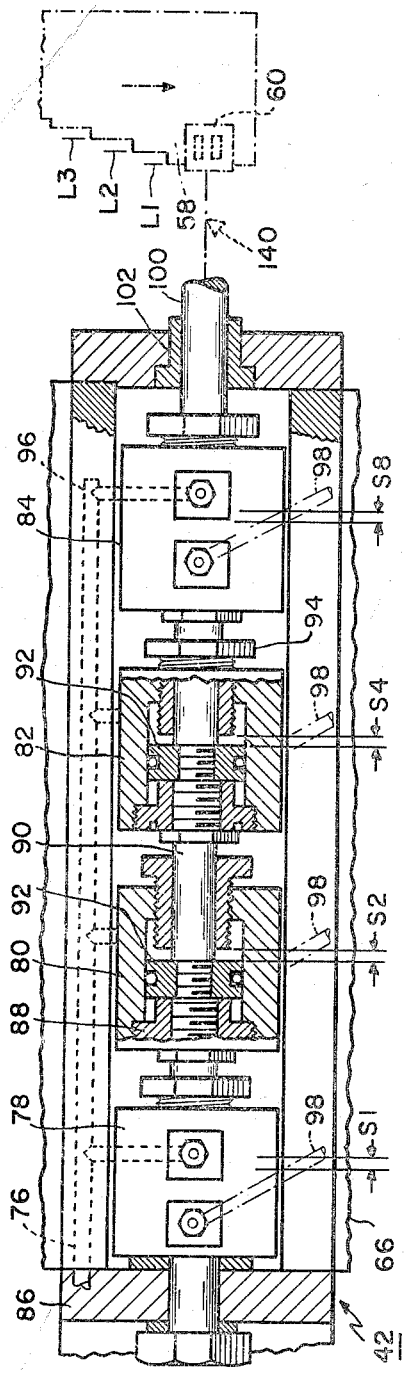
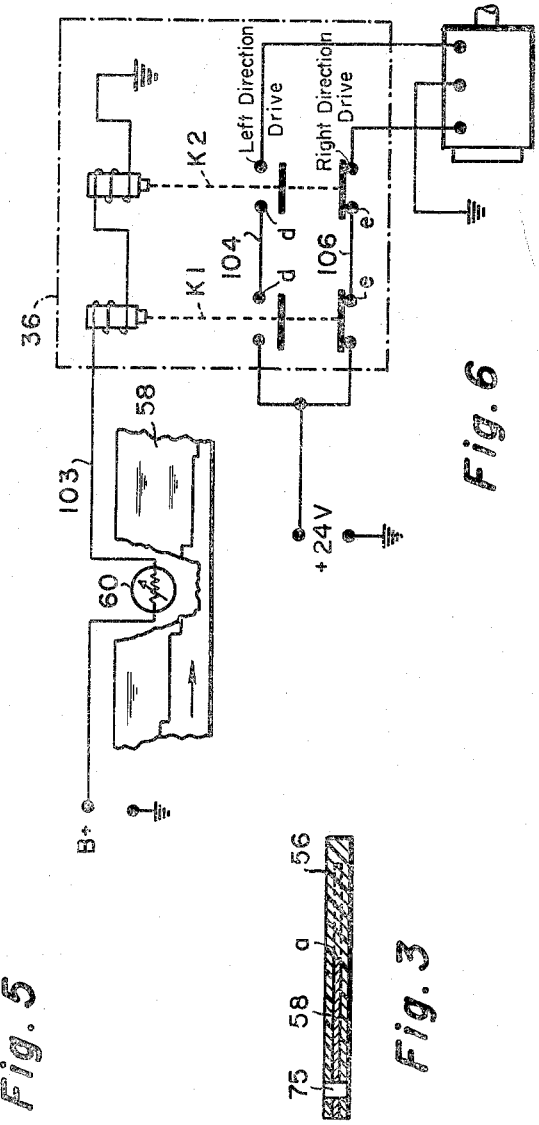

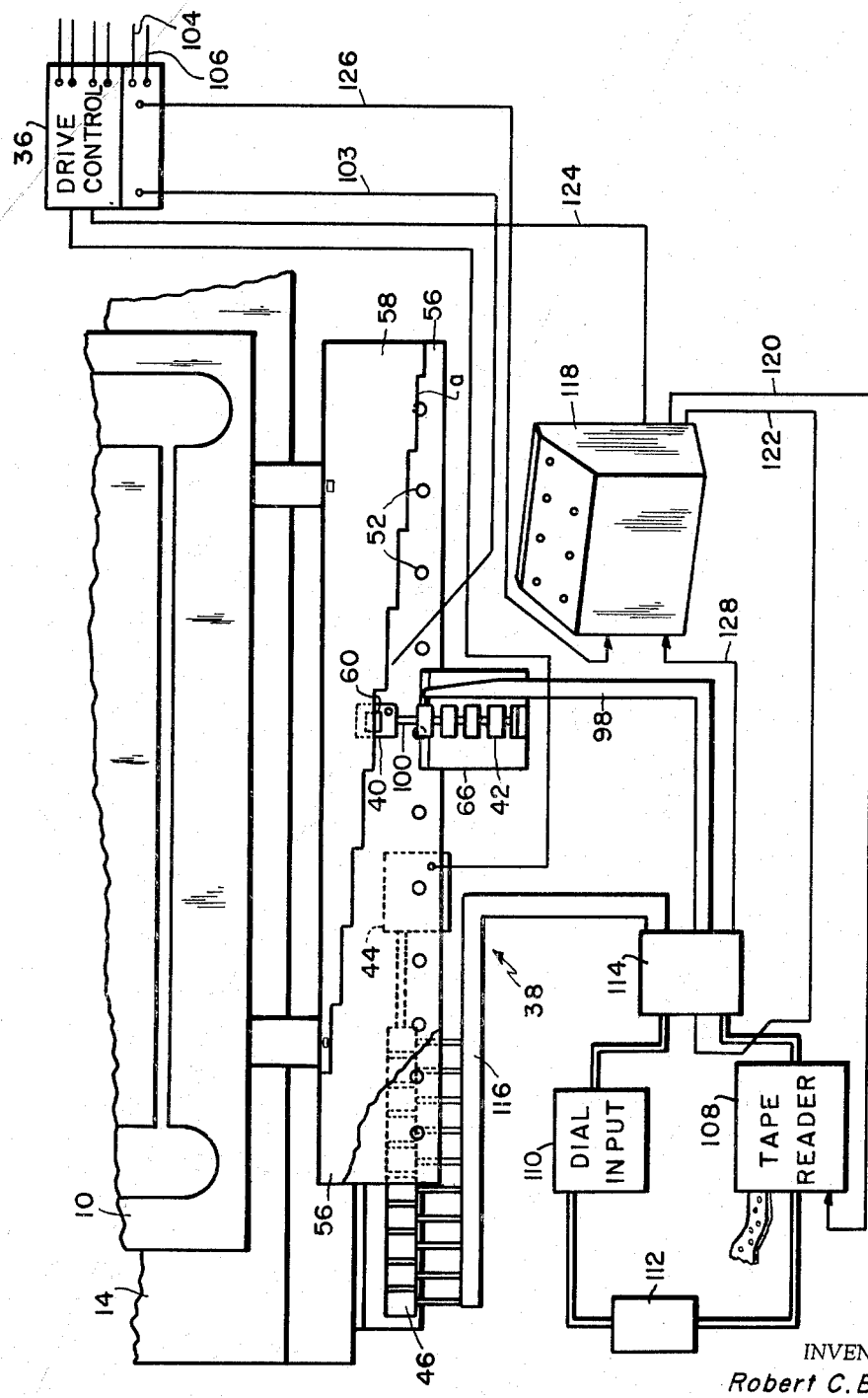

United States Patent Office 3,210,550
Patented Oct. 5, 1965

3,210,550
PHOTOSENSITIVE TABLE POSITIONING
CONTROL
Robert C. Benton, State College, Pa., assignor to Chemcut
Corporation, a corporation of Pennsylvania
Filed Aug. 13, 1962, Ser. No. 216,676
8 Claims. (Cl. 250—234)

The present invention relates to the relative positioning of tables or other work supports, tools, and the like for automatic machining. In the phase of this operation to which the invention primarily relates, a photosensitive system provides control in novel manner whereby I employ a single photosensitive device effective for bidirectional control.

According to one practice in machining beginning at a point on a workpiece, automatic positioning apparatus which is provided causes the machine to advance to the next machining point by two stages through a serial method of positioning. First, a large increment of movement is made to coarse limits at rapid speed, whereupon final positioning takes place with a comparatively slow, "inching" of the parts into their final position so as to achieve high decimal accuracy at the point where the movement precisely stops.

In accordance with the present invention, I provide a reliable first-stage means affording coarse positioning in quick, direct fashion without unduly delaying start of the final positioning. More particularly, either one of the relatively movable table part or tool-supporting part carries a light source device and a registering photosensitive device which I provide thereon, and the other part carries a companion profiled member which intervenes in the light path between the two devices.

The companion member just noted is shaped with the profile varying such that its width dimension increases along the length of the companion member. The photosensitive device is effective to detect the precise point where the light path intersects this profile; the point is obviously a relative one and the shape of the profile allows the point to be accurately referenced to the table length. In other words, the particular lengthwise position selected is solely controllable by a transverse gage which I provide. The gage is preset from input data and is connected to make transverse adjustments automatically between the profiled member and the registering photoelectric devices.

An object of this invention is the provision, between two relatively movable machine parts, of a profiled member having a widening profile and being connected to one part, and a profile sensing apparatus connected to the other part for detecting the relative position between the machine parts on basis of the known length-to-width relationship incorporated in the profiled member.

Another object, in line with the preceding objective, is to provide an accurate means of transverse gaging of the position of the profile sensing apparatus with respect to a profiled member on a table, so that desired areas preselected by the apparatus along the length of the profiled member are precisely referenced to the length of the table.

A further object is the provision, in a table drive having a positioning control consisting of a member with a profile presenting a moving series of points, of a relatively fixed photosensitive device which in dependence on its relation to the locus of those points provides bidirectional control for the drive. More particularly, the photosensitive device has a satisfied position when in transverse alignment with any one of said points on said profile, and functions to operate the drive in one sense when the selected point is in a position to one side of the satisfied position of the photosensitive device, and functions to operate the drive in the opposite sense when the selected point is in a position on the opposite side thereof. That is to say, when the photoelectric device is outside of the profile it receives full light to function in the one sense whereas when fully inside of the profile, it is occluded so as to receive no light and operates the table in the opposite sense.

These features will now be explained and further features, objects and advantages will either specifically be pointed out or become apparent when, for a better understanding of the invention, reference is made to the following description taken in conjunction with the accompanying drawings which form a part hereof and in which:

FIGURE 3 is a transverse view of a plastic part, the detail being a section taken along the lines III—III of FIGURE 1;

FIGURE 5 is a partially schematic, partially sectioned view in plan taken along the lines V—V of FIGURE 2;

FIGURE 6 is a schematic showing of a bidirectional control circuit in the output of a single photosensitive device; and FIGURE 7 is a partially schematic view showing the principal control apparatus of the system.

Figure 1:
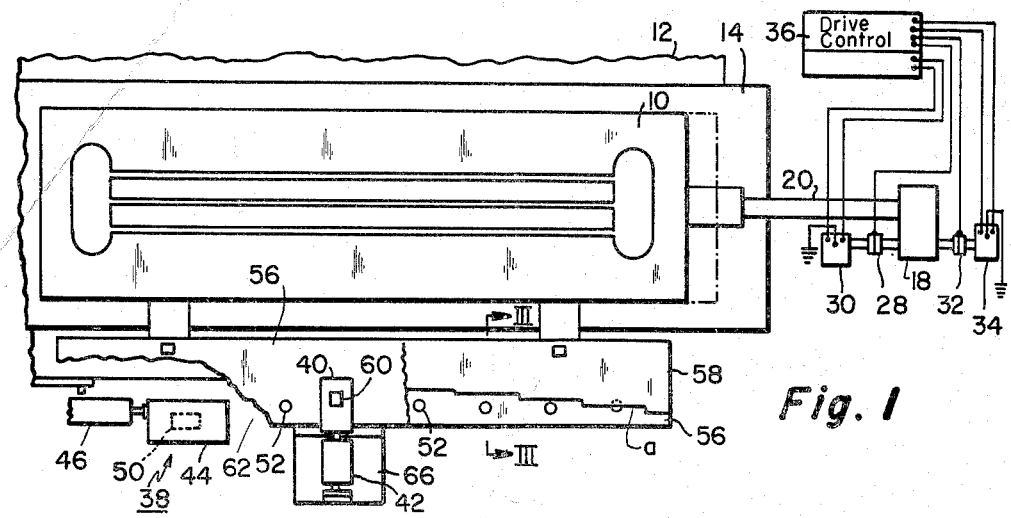
FIGURES 1 and 2 are top plan and side elevational views respectively of the workpiece-carrying portions of a machine tool embodying the present invention.
Figure 2:
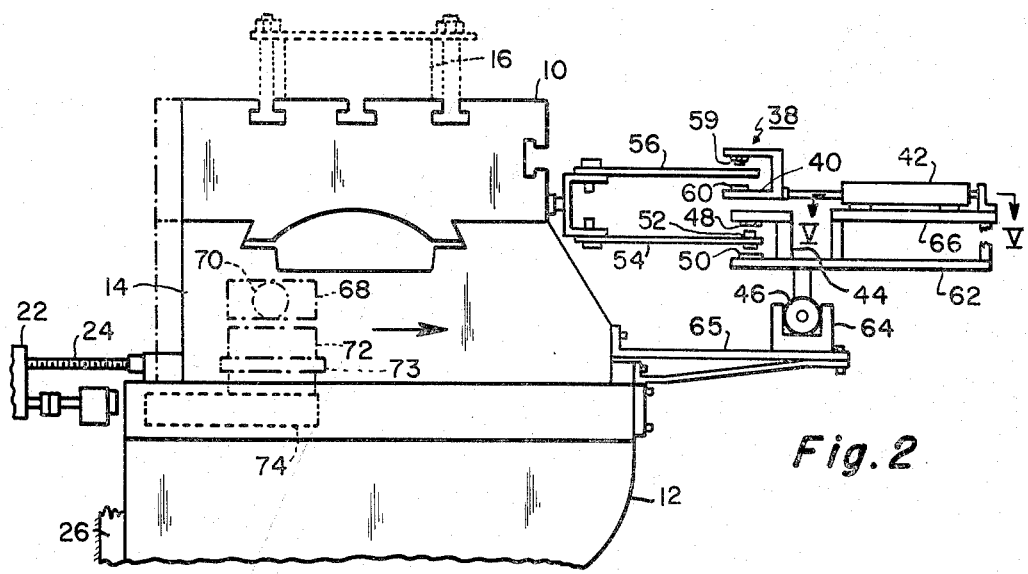

More particularly in the drawings, the workpiece-carrying portions of a machine tool shown in FIGURES 1 and 2 include a longitudinally movable table 10, a curved knee 12, and a saddle 14 which is supported by the knee and which supports the table 10. The table 10 carries a workpiece indicated by the dotted lines 16 and adapted to be machined by drilling, milling, etc., depending on the particular machine tool.

A dual motor drive 18 operates a lead screw 20 for moving the table 10 longitudinally from its dotted line position shown in dotted lines in FIGURE 1 to selected positions in the direction indicated by the arrow. A similar drive 22 and lead screw 24 control transverse movement of the saddle 14 so that the table and saddle move conjointly from the dotted line position shown by the dotted lines in FIGURE 2 in the axial direction indicated by the arrow. The knee 12 is also adjusted by appropriate means along a set of vertical ways carried by the machine and generally indicated at 26.

Because of the similarity of the drives, only the dual motor drive 18 is described. An electrically actuated clutch 28 couples an inch motor 30 to one input shaft of the dual drive 18; another electrically actuated clutch 32 couples a decimal motor 34, which is of the stepping type, to the other input shaft of the drive 18. A drive control 36 is connected to the clutches and the motors to operate them in the proper drive direction at the right time.

An automatic positioning control 38 includes one or more large increment positioners 40 each operated by short binary-to-decimal positioning devices or gages 42, and further includes a small increment positioner 44 and a binary-to-decimal positioning device or gage 46.

One small increment positioner 44 of suitable characteristics is the null sensor type generally as shown and described in my copending U.S. Patent No. 3,184,599. Briefly, it consists of a lamp 48, a registering photoelectric null sensor 50, and a line of upright, spaced-apart, light guide tubes 52 intervening in the light path between the lamp 48 and the sensor 50. The tubes 52 are carried by an opaque lower panel member 54 connected to the table 10 and, in one physically constructed embodiment of the invention, they were spaced 1.000 inch apart measured in the lengthwise direction along the member 54.

One binary decimal gage 46 of satisfactory characteristics is the type generally as shown in Benton and Whitehouse application S.N. 216,653 filed August 13, 1962, now Patent No. 3,154,858. Briefly, the gage 46 has a 1.000 inch full range of travel and operates automatically to move a positionable device to any selected decimal point within that range of travel.

An upper panel member 56, which includes a stepped, opaque profile portion 58, is connected to the table 10 to overlie the panel member 54 in spaced-apart relation. The balance of the upper panel member 56 is transparent or translucent and this panel intervenes in the light path between a lamp source 59 carried by the large increment positioner 40 and a registering photosensitive device 60.

A common control stand 62 positioned by the binary decimal gage 46 carries the small increment positioner 44 and further carries a platform 66 supporting the short binary gage 42. The gage 46 has a box frame 64, and a bracket 65 which supports the frame 64 is carried at the side of the saddle 14.

As viewed in FIGURE 1, the stroke of the gage 46 and the movement of the common control stand 62 are in a direction parallel to the path of the table, whereas the stroke of the gage 42 on the platform 66 is perpendicular thereto so as to provide for transverse adjustment of the large increment positioner 40 relative to the upper panel member 56. In that way, each of the steps $a$ of the profile portion 58 is selectable and the steps $a$ are referenced to particular lengthwise areas sought on the table 10.

A similar large increment positioner 68, its short binary gage 70 (corresponding to gage 42), a small increment positioner 72, the common control stand 73, and the binary decimal gage 74 which adjustably carries the stand 73 are provided for controlling the drive 22 which operates the lead screw 24. Only a single positioner 40 and only a single positioner 68 are shown in FIGURES 1 and 2, which stress the principles rather than the preferred details of the large increment positioners. For long stroke tables, several large increment positioners are provided for practical reasons in the preferred embodiment, as will be described shortly.

In FIGURE 3, a panel member 56 of the foregoing characteristics is readily constructed by laminating a metal piece as an integral part of a transparent or translucent plastic strip so as to form the opaque portion 58 thereof. Thin copper has been found satisfactory for this metal piece and the steps $a$ thereon can be formed in the profile to accurate decimal tolerances. The plastic protects them from bending and deterioration and the arrangement is feasible because the sensor is a non-contact device 60. A series of slots 75 which are elongated in the lengthwise direction of the panel member provides attachment points and affords proper lengthwise adjustment in initially lining up the panel member 56 with relation to the table 10.

Figure 4:
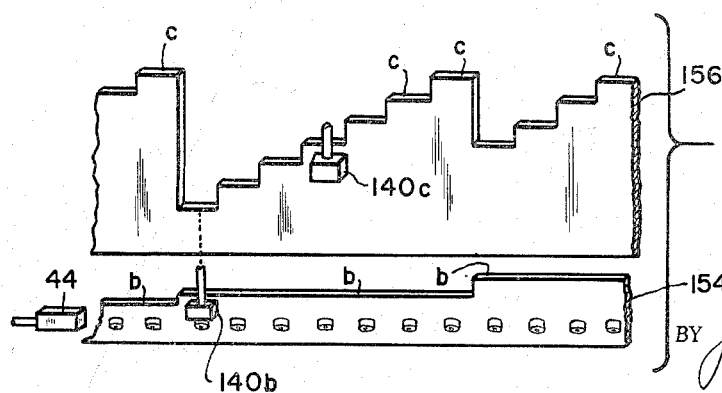
FIGURE 4 is an isometric view of a preferred embodiment of a detail of the invention, with the showing of FIGURE 3 omitted for clarity.

In the preferred embodiment somewhat schematically shown in FIGURE 4, the lower and upper panel members 154 and 156 include serrated, opaque portions of metal respectively presenting the lower, longer steps $b$ and sets of upper steps $c$. A longitudinally movable, small increment positioner 44 carries a null sensor cooperating with the tubes 52 of the lower panel member 154; an intermediate, large increment positioner 140c cooperates with the step elements $c$ and a larger increment positioner 140b cooperates with the longer step elements $b$.

The positioners including the small increment positioner 44 are longitudinally adjusted in the previous manner by a common binary decimal gage. The intermediate increment positioner 140c is simultaneously transversely adjusted by means of a short, binary gage, not shown. The larger increment positioner 140b is simultaneously transversely adjusted by another short, binary gage, not shown.

In one physically constructed embodiment of the invention the steps $b$ were 0.100 inch apart measured widthwise of the panel member 154 and were 10.000 inches long. The steps $c$ were 0.100 inch apart measured widthwise on the panel member 156 and were 1.000 inch long.

In operation, when the positioners are all pre-set, the positioner 140b causes the drive control 36 and motor 30 to move the table to the point where the profile of the selected ten-inch step $b$ first enters its satisfied position of transverse alignment with the positioner 140b. A control switchover takes place, and the positioner 140b is deactivated.

The other large increment positioner 140c is activated, causing the drive control 36 and motor 30 to move the table to a point where an initial position of transverse alignment is established with a selected one-inch step $c$. The positioner 140c is deactivated and the null sensor of the small increment positioner 44 is activated so that the nearest light tube 52, which has been preselected, is sensed. The sensor 50, through a connection with the drive control 36, operates the decimal motor 34 to move the table 10, panel members, and tubes 52; the selected tube 52 is moved according to principles of follow-up mechanism in following the positioner 44 to its pre-set point for precisely stopping the table in final position.

In the physically constructed embodiment of the invention just described, the positioner 140b prior to switchover was allowed to operate the motor 30 at full speed until the selected tube 52 was inside a ten inch range of the null sensor of the positioner 44. After switchover, the photosensitive device of the positioner 140c operated the motor 30 at full speed to a point where the selected tube 52 was inside the nearest inch range of the null sensor.

The null sensor 50 of the positioner 44 can be adjusted to three or four places of decimal accuracy. Actually, it was adjusted so that, when activated, the sensor caused the table 10 to be stopped in final position reading to three-place decimal accuracy.

In illustrative figures, the large increments will be assumed to be sixty inches and six inches respectively, and the small increment is of a 0.666 inch value whereupon the null sensor is pre-set 0.666 inch away from zero reference position in its range of travel. Thus the final table setting is the cumulative figure 66.666 inches, representing the total of the three increments. It is understood that the steps $c$ are grouped in separate decades, there being one decade for each long step $b$ in the panel member 154.

In FIGURE 5, the short, binary gage 42 shown is a difference gage consisting of piston and cylinder units in a box frame 76 supported on the platform 66. Four piston and cylinder units 78, 80, 82 and 84 are interconnected by their piston rods in a tandem arrangement, with the cylinder of the unit 78 being secured by an anchoring bolt to a fixed gage stop consisting on an end wall 86 of the box frame. A rear bushing 88 is threaded into an end of each cylinder so as to close the rear end. A piston rod 90 carried by a piston 92 in each cylinder extends through a front adjustable bushing 94 which is threaded into the front end of each cylinder.

A common manifold 96 connected to the front end of each cylinder supplies retractive air to that end, and individual binary controlled air lines 98 selectively apply air to the rear end of the cylinders for advancing the pistons of selected ones of them. The effective strokes of the pistons are respectively indicated at S1, S2, S4 and S8 and they are activated in various combinations to aggregate the total gage length setting desired.

The cylinder 84 at the unanchored end of the tandem arrangement has a piston rod 100 sliding in a support bearing 102 and establishing the ultimate position of the photosensitive device 60 of a large increment positioner 140. In this way, the photosensitive device 60 is selectively preadjusted with its centerline C.L. aligned with the locus of travel L1, L2, L3, etc., of any selected step of the serrated opaque portion 58 of a panel member.

If the English system of measurement is used, the strokes S1, S2, S4 and S8 are generally proportioned so that in binary combinations they produce a full inch of travel in ten decimal steps of 0.1 inch apiece. A satisfactory pattern for this proportion is one-two-four-eight affording a stroke 0.1 inch at S1, a stroke 0.2 inch at S2, a stroke 0.4 inch at S4, and a stroke of 0.8 inch at S8. Actuation of only cylinders 80 and 82, causes the gage to extend 0.6 inch from a zero reference point. Actuation of only cylinders 78, 80 and 82, causes the gage to extend 0.7 inch, etc. The gage 42 can be reduced slightly in length by affording the cylinders 82 and 84 an identical length of stroke of 0.4 inch apiece. Producing a movement of 0.9 inch requires, in that case, actuation of cylinders 78, 82, and 84.

In FIGURE 6, a portion of the drive control 36 is schematically shown, being the bidirectional control portion operated by the photosensitive device 60. When covered by the profiled, opaque portion 58 of the table-connected member, the device 60 operates the inch motor 30 so that the panel member moves specifically in the direction of the arrow as viewed in FIGURE 6. Conversely, when the device 60 is free from the opaque profile as shown in FIGURE 1, the inch motor 30 operates so that the panel member moves in the direction of the arrow of FIGURE 1.

More particularly in FIGURE 6, the device 60 is in a circuit 103, connected in series with two control relays K1 and K2 having different sensitivity to current. When the device 60 is in the dark, both relays K1 and K2 are deactivated, closing a right direction drive circuit 106 as shown in FIGURE 6. When the device 60 is fully illuminated, both relays are activated closing a left direction drive circuit 104. When the device 60 is partly illuminated, the relay K1 is activated whereas the relay K2 which is less sensitive is deactivated. Thus a satisfied condition is established, with both circuits 104 and 106 open and the motor drive interrupted. For this purpose, the relay K1 has an upper set of contacts d included in series with an upper set of contacts d of the relay K2 in the left direction drive circuit 104, which is connected to one winding in the inch motor 30; a lower set of contacts e of the relay K1 is in series with a lower set of contacts e of the relay K2 in the right direction drive circuit 106, which is connected to another winding in the inch motor 30.

The electrical delay, sequencing, and control circuits, including a reversing contactor with mechanical interlock to prevent application of power simultaneously in the right and left drive circuits 104 and 106, are well known in the art and therefore are not illustrated in any figures.

It is evident that the motor 30 drives the table in a direction inherently causing the profile member to block light from the device 60 if the device 60 is uncovered, and in the opposite direction to unblock the device 60 if it is fully covered.

Following is one example of circuit specifications in FIGURE 6:

Current flow, circuit 103,
  device 60 blocked _____ 0.1 milliamp.
Current flow, circuit 103,
  device 60 partly illum. _____ 5 milliamp.
Current flow, circuit 103,
  device 60 fully illum. _____ 15 milliamp.
Actuation current, relay K1 _____ 1 milliampere.
Actuation current, relay K2 _____ 10 milliamperes.
Device 60 _____ Photosensor of photoresistor type.

One make of photoresistor device 60 found entirely suitable is Clairex Photocell CL504L. It is evident that the resistance of the circuit 103 can be initially adjusted for the current values sought by an adjustable resistor inserted therein. The value of the resistor selected depends, of course, upon the particular resistance characteristics of the coils of relays K1 and K2, and the resistance characteristics of the device 60 under the illumination level available.

Irrespective of whether the left direction drive circuit 104 is energized or the right direction drive circuit 106 is energized by the relays K1 and K2 and the device 60, it is apparent the device and the relays reach their satisfied position at the first instant when the profile portion 58 allows the device 60 to be partially illuminated. Thus, this satisfied condition in which both circuits 104 and 106 are open is always initially reached with the table at full speed and still approximately one-half inch away from the correct or final set point. This coarseness of operation is intentional, whereby the device 60 is made to sense and to show a change from incorrect indication to correct indication prematurely by this deliberate amount of error. Hence, switchover occurs from the condition in which the inch motor 30 is in control to the condition in which the decimal, stepping-type motor 34 is in control, always with adequate distance left for slowdown of table momentum by the motor 34. The danger of undershoot or overshoot with respect to final position is therefore practically obviated; the table drastically slows and null sensor 50 accurately steps it into final position and no farther, through accurate control of the interruption point of the series of current impulses being fed to the stepping-type, decimal motor 34.

A control apparatus as shown according to FIGURE 7 employs the decimal-to-binary code system of positioning, the decimal machining data being encoded into a binary code needed to operate the respective positioners of the present apparatus. A tape reader 108 provides automatic input and reads from perforated tape, perforated cards, magnetic tape, or a like device encoded in binary code. A dial input device 110 serves as an alternate input, on which dial-carrying, rotary switches or like devices are provided to automatically encode, into the binary code, the decimal machining data set on the dials. For piecework operation, an operator usually manually sets the dials on the input device 110 whereas, for quantity production, a prepunched, binary tape is fed into the reader 108 for fully automatic operation enabling the tape reader to control the increment positioners directly.

An air supply 112 is common to the reader 108 and to the dial input device 110; their pneumatic output is supplied to a transfer valve and switch unit 114. The unit 114 supplies the air from one or the other through selected ones in the bundle of air lines 98 leading to the short binary gage 42, and through selected ones of other lines 116 in a bundle leading to the binary decimal gage 46.

A programming console 118 has a connection 120 to the tape reader 108 for advancing the reading and for timing the tape reader in its operation of the other controls. The console 118 has another connection 122 to the unit 114 for setting the unit in the proper position. The console 118 has another connection 124 to the drive control 36 for controlling the operation thereof. The console 118 also monitors the operation of the drive control 36, the tape reader, and the unit 114 through feedback loops 126 and 128 respectively.

In the operation of the apparatus of FIGURE 7, the console 118 operates the reader 108 to take a new reading. The reader 108 pneumatically sets the gages 42 and 46, and each photosensitive device 60 and its lamp 58 are activated. The inch motor 30 is operated by current through the left direction drive circuit 104 (FIGURE 6) or right direction drive circuit 106 and, in a sequence of table movements causes the one or more large increment positioners to take their respective satisfied positions, the solid line showing of FIGURE 7 being illustrative of a satisfied position at 60.

The console 118 automatically activates the positioner 44 which then operates the decimal motor 34 (FIGURE 1), and the table rapidly follows into its final decimally set position as sensed by the null sensor 50. The table is locked by means, not shown, and simultaneously the saddle 14 is being moved and locked in a final position.

The gages 42 and 46 are automatically reset, a machining operation takes place at the selected area on the workpiece 16, and the machine retracts the tool head to an inactive position.

The operation is then repeated.

In the present installation, the device 60 has proved highly accurate. This accuracy is improved by keeping the active area of the device 60 very small, either by selection of a small photoresistor or through masking down the effective area of a photoresistor. The change of current in the circuit 103 therefore is comparatively high for minor variations in the amount of illumination falling on the surface 60 and thus the hysteresis of the system can be kept adjusted accurately to a few hundredths of an inch. The photosensitive surface employed is a non-contact table-stopping device as already indicated. Hence, wear, distortion, and the requirement of service adjustments are minimized compared to the usual limit switches, stopping pawls, and other forms of direct-contact stopping devices.

What is claimed is:

1. In apparatus comprising first and second elements, and having drive means for relatively positioning the elements along a generally longitudinally extending axis, the combination of:
   a photoelectric device comprising
   a photosensor; and
   a light source for illuminating same;
   a panel between the photosensor and the light source, said panel being disposed longitudinally along the direction of relative movement and adapted to be mounted on the first element;
   said panel from end to end presenting a generally diagonally extending, regularly serrated profile, said profile providing a division between a major, clear area at one side thereof, and an opaque, complementary inside area at the other side within the panel, said major clear area at the one side allowing light to pass clear, simultaneously at all points on said one side and through the plane of the panel;
   the successive serrations of said profile being of a number defining a like number of loci of travel all parallel to one another;
   positioning means adapted to be mounted on the second element for supporting the photoelectric device thereon, said positioning means effective to adjust the position of the photoelectric device in a direction both transverse to said longitudinally extending axis and parallel to the plane of the panel, to pre-reference the relative position of the photoelectric device in longitudinal registration with the locus of travel of a selected serration of the profile; and
   automatic means for controlling said drive means, said automatic means being connected in the output of said photoelectric device and operative at the point at which a pre-selected serration and the photoelectric device come into registration with one another.

2. In apparatus comprising first and second elements, and having drive means for relatively positioning the elements along a generally longitudinally extending axis, the combination of:
   a photoelectric device comprising
   a photosensor; and
   a light source for illuminating same;
   a panel between the photosensor and the light source, said panel being disposed longitudinally along the direction of relative movement and adapted to be mounted on the first element;
   said panel from end to end presenting a generally diagonally extending, regularly serrated profile, said profile providing a division between a major, clear area at one side thereof, and an opaque, complementary, inside area at the other side within the panel, said major clear area at the one side allowing light to pass clear, simultaneously at all points on said one side and through the plane of the panel;
   the successive serrations of said profile being of a number defining a like number of loci of travel all parallel to one another;
   first positioning means adapted to be mounted on the second element for supporting the photoelectric device thereon, said positioning means effective to adjust the positioning of the photoelectric device in a direction both transverse to said generally longitudinally extending axis and parallel to the plane of the panel, to pre-reference the relative position of the photoelectric device in longitudinal registration with the locus of travel of a selected serration of the profile;
   automatic means for controlling said drive means, said automatic means being connected in the output of said photoelectric device and operative at the point at which a pre-selected serration and the photoelectric device are in transversely aligned relationship with one another; and
   means for mounting said first positioning means on the second element and comprising second positioning means, said second positioning means moving the first positioning means through limited travel in the aforesaid direction of relative movement to pre-set the point at which the photoelectric device and the pre-selected serration come into mutual registration.

3. In apparatus comprising first and second elements and having drive means to cause relative movement between the elements along a longitudinal axis, the combination of:
   a photoelectric device comprising
   a photosensor; and
   a light source for illuminating same;
   a panel between the photosensor and the light source, said panel being disposed longitudinally along the direction of relative movement and adapted to be mounted on the first element;
   said panel from end to end presenting a generally diagonally extending, regularly serrated profile, said profile providing a division between a major, clear area at one side thereof, and an opaque, complementary inside area at the other side within the panel, said major clear area at the one side allowing light to pass clear, simultaneously at all points on said one side and through the plane of the panel;
   the successive serrations of said profile being of a number defining a like number of loci of travel all parallel to one another;
   positioning means adapted to be mounted on the second element for supporting the photoelectric device thereon, said positioning means effective to adjust the position of the photoelectric device in a direction which is both transverse to said longitudinal axis and parallel to the plane of the panel, to pre-reference the position of the photoelectric device in longitudinal registration with the locus of travel of a selected serration of the profile;
   said photosensor being illuminated at all times at which it is on said one side of the division presented by said profile and, when it is on the other side, being inactivated by the darkness of the opaque, complementary, inside area within the panel; and
   power delivery means connected in the output of the photoelectric device for applying power to operate said drive means in one sense, only when the photoelectric device is in a position on said one side of the division presented by said profile, and to operate the drive means in the opposite sense, only when the photoelectric device is on said other side in the darkness.

4. In apparatus comprising first and second elements and having drive means to cause relative movement between the elements along a longitudinal axis, the combination of:
 a photoelectric device comprising
  a photosensor; and
  a light source for illuminating same;
 a panel between the photosensor and the light source, said panel being disposed longitudinally along the direction of relative movement and adapted to be mounted on the first element;
 said panel from end to end presenting a generally diagonally extending, regularly serrated profile, said profile providing a division between a major, clear area at one side thereof, and an opaque, complementary inside area at the opposite side within the panel, said major clear area at the one side allowing light to pass clear, simultaneously at all points on said one side and through the plane of the panel;
 the successive serrations of said profile being of a numbed defining a like number of loci of travel all parallel to one another;
 positioning means adapted to be mounted on the second element for supporting the photoelectric device thereon, said positioning means effective to adjust the position of the photoelectric device in a direction which is both transverse to said longitudinal axis and parallel to the plane of the panel, to pre-reference the relative position of the photoelectric device in longitudinal registration with the locus of travel of a selected serration of the profile;
 said photosensor being illuminated at all times at which it is on said one side of the division presented by said profile, and when on the other side, being inactivated due to the darkness of the opaque, complementary, inside area within the panel, and having a satisfied condition when the pre-selected serration and the photoelectric device are aligned; and
 power delivery means connected in the output of the photoelectric device for applying power to operate said drive means in one sense, only when the photoelectric device is in a position on said one side of the division presented by said profile, and to operate the drive means in the opposite sense, only when the photoelectric device is on said other side in darkness, said drive means thereby being bidirectionally operated automatically in each respective sense to establish the photoelectric device and the pre-selected serration in transverse alignment so as to satisfy the photosensor.

5. In apparatus comprising first and second elements and having drive means to cause relative movement between the elements along a longitudinal axis, the combination of:
 a photoelectric device comprising
  a photosensor; and
  a light source for illuminating same;
 a panel between the photosensor and source, said panel being disposed longitudinally along the direction of relative movement and adapted to be mounted to the first element, said panel comprising a flat strip of translucent material and having an opaque portion;
 the opaque portion presenting, from end to end of said panel, a generally diagonally extending regularly serrated profile, said profile providing a division between a major, clear area at one side thereof, and an opaque, complementary inside area at the opposite side constituted by the opaque portion, said major clear area at the one side allowing light to pass clear, simultaneously at all points on said one side and through the plane of the flat strip;
 the successive serrations of said profile being of a number defining a like number of loci of travel all parallel to one another;
 positioning means adapted to be mounted on the second element for supporting the photoelectric device thereon, said positioning means comprising power cylinders connected mechanically in tandem alignment, said cylinders being effective to adjust the position of the photoelectric device in a direction which is both transverse to said longitudinal axis and parallel to the plane of the flat strip, to pre-reference the position of the photoelectric device in longitudinal registration with the locus of travel of a selected serration of the profile;
 said photosensor being illuminated at all times at which it is on the one side of the division presented by said profile, and when on the other side, being inactivated due to the darkness of the opaque portion of the flat strip; and having a satisfied condition when a pre-selected serration and the photoelectric device are in registration; and
 power delivery means connected in the output of the photoelectric device for applying power to operate said drive means in one sense, only when the photoelectric device is in a position on said one side of the division presented by said profile, and to operate the drive means in the opposite sense, only when the photoelectric device is on said other side in darkness, said drive means thereby being bidirectionally operated automatically in each respective sense to establish the photoelectric device and the pre-selected serration in mutual registration so as to satisfy the photosensor.

6. In apparatus comprising first and second elements and having drive means to cause relative movement between the elements along a longitudinal axis, the combination of:
 first and second photoelectric devices, each comprising
  a photosensor; and
  a light source for illuminating same;
 first and second parallel panels interposed in the light of the respective first and second photoelectric devices so as to be between each photosensor and its source;
 each panel being disposed longitudinally along the direction of relative movement and adapted to be mounted on the first element, each panel presenting a generally diagonally extending, regularly serrated profile, said profile providing a division between a major, clear area at one side thereof, and an opaque, complementary inside area at the other side within that panel, said major clear area at the one side allowing light to pass clear, simultaneously at all points on said one side and through the plane of the panel;
 the successive serrations of each profile being of a number defining a like number of loci of travel all parallel to one another;
 first and second positioning means adapted to be mounted on the second element and associated with and supporting the respective first and second photoelectric devices, each positioning means being effective to adjust the position of the associated photoelectric device in a direction which is both transverse to said longitudinal axis and parallel to the planes of the panels, to pre-reference the relative position of each photoelectric device in longitudinal registration with th locus of travel of a selected serration of a profile;
 said first panel having the serrations equidistantly spaced apart by one unit in the profile, said second panel having the serrations equidistantly spaced apart in the profile by a multiple of said unit; and
 automatic means for controlling said drive means, said automatic means being connected in the output of the first and second photoelectric devices and operative in sequence, respectively, at the point at which a pre-selected serration and the second photoelctric device mutually register, and at the point at which a pre-selected serration and the first photoelectric device mutually register.

7. In apparatus comprising first and second elements and having drive means to cause relative movement between the elements along a longitudinal axis, said drive means being reversible and having input circuit means, the combination of:

a photoelectric device comprising
a photosensor; and
a light source for illuminating same;
a panel between the photosensor and the light source, said panel being disposed longitudinally along the direction of relative movement and adapted to be mounted on the first element;
said panel from end to end presenting a generally diagonally extending, regularly serrated profile, said profile providing a division between a major, clear area at one side thereof, and an opaque, complementary inside area at the other side within the panel, said major clear area at the one side allowing illumination to pass clear, simultaneously at all points on said one side and through the plane of the panel;
the successive serrations of said profile being of a number defining a like number of loci of travel all parallel to one another;
positioning means adapted to be mounted on the second element for supporting the photoelectric device thereon, said positioning means effective to adjust the position of the photoelectric device in a direction which is both transverse to said longitudinal axis and parallel to plane of the panel, to pre-reference the relative position of the photoelectric device in longitudinal registration with the locus of travel of a selected serration of the profile;
said photosensor being illuminated at all times at which it is on said one side of the division presented by the profile and, when it is on said other side, being inactivated due to the darkness of the opaque, complementary inside area within the panel; and
power delivery means for applying power to operate the reversible drive means, said power delivery means comprising relay means in circuit with the photosensor and having contacts for connection in the input circuit means of the reversible drive, said contacts operative when the photosensor is in the full illumination of the source to apply power of one sense to the drive for relatively moving the elements in one direction, and operative when the photosensor is in the dark to apply power of the opposite sense to the drive for relatively moving the elements in the reverse direction.

8. In a positionable table structure having motion along a first axis:

a table-connected member having a profile which increases in width along said axis;
a photo-cell member sensing the profile of the table-connected member, said photo cell member having a position along the axis of said table-connected member; and
a photo-cell positioning device consisting of tandem pneumatic cylinders connected in mechanical alignment to provide adjustment between the members along an axis transverse to said first axis, whereby the photo cell member intersects the profile at a predetermined point along the first axis, referenced to the length' of the table-connected member, there being four cylinders with stroke lengths in the respective proportion of one-two-four-eight, whereby they are capable in appropriate combinations to yield all ten decimal readings of one place, each cylinder being provided with a precise means of stroke adjustment affording said proportional differences exactly.

References Cited by the Examiner
UNITED STATES PATENTS

| | | | |
|---|---|---|---|
| 2,065,960 | 12/36 | Bauml | 250—219 |
| 2,686,894 | 8/54 | Mathieu | 250—234 X |
| 2,694,804 | 11/54 | Wagner | 250—237 |
| 2,827,699 | 3/58 | Schultze | 88—14 |
| 3,037,420 | 6/62 | Stade | 250—234 X |
| 3,067,333 | 12/62 | Allais et al. | 250—237 |

RALPH G. NILSON, *Primary Examiner,*
WALTER STOLWEIN, *Examiner.*